(12) United States Patent
Guitton et al.

(10) Patent No.: US 11,097,498 B2
(45) Date of Patent: Aug. 24, 2021

(54) LINER AND COMPOSITE TANK ASSEMBLY METHOD

(71) Applicants: Maurice Guitton, Lunenburg (CA); Martin Dugas, Lunenburg (CA); Eric Dugas, Caraauet (CA); Neri Jean, Tracedie-Sheila (CA); Jacques Dugas, Caraquet (CA)

(72) Inventors: Maurice Guitton, Lunenburg (CA); Martin Dugas, Lunenburg (CA); Eric Dugas, Caraauet (CA); Neri Jean, Tracedie-Sheila (CA); Jacques Dugas, Caraquet (CA)

( * ) Notice: Subject to any disclaimer, the term of this patent is extended or adjusted under 35 U.S.C. 154(b) by 567 days.

(21) Appl. No.: 15/991,925

(22) Filed: May 29, 2018

(65) Prior Publication Data
US 2019/0134925 A1    May 9, 2019

Related U.S. Application Data

(63) Continuation of application No. 14/261,078, filed on Apr. 24, 2014, now abandoned.
(Continued)

(51) Int. Cl.
*B29C 70/48* (2006.01)
*B29C 69/02* (2006.01)
(Continued)

(52) U.S. Cl.
CPC .............. *B29C 69/02* (2013.01); *B29C 41/04* (2013.01); *B29C 41/045* (2013.01); *B29C 41/20* (2013.01);
(Continued)

(58) Field of Classification Search
CPC ....... B29C 70/48; B29C 69/02; B29C 41/045; B29C 70/865; B29C 41/22
See application file for complete search history.

(56) References Cited

U.S. PATENT DOCUMENTS 3,875,275 A * 4/1975 Lemelson ............. B29C 33/048
                                              264/45.3
4,043,721 A * 8/1977 Lemelson ............. B29C 33/046
                                              425/116
(Continued)

OTHER PUBLICATIONS

Chang, W.C., et al., Multilayered Glass Fibre-reinforced Composites In Rotational Moulding, The 14th International ESAFORM Conference on Material Forming, AIP Conf. Proc., vol. 1253 (2011) pp. 708-713. (Year: 708).*

*Primary Examiner* — Matthew J Daniels
(74) *Attorney, Agent, or Firm* — Dean A. Craine, P.S.

(57) ABSTRACT

An improved liner for a container in which gases, liquids, or powders are stored. The liner is a multi-layer structure made in a roto molding machine. The liner includes a first outer layer made of metallocene polyethylene, an intermediate gas and liquid impermeable layer, and one or more inner layers made of thermoplastic material compatible with the material stored inside the container. During the molding process, the three layers are made sequentially with the second and third layers being bonded and fused to the adjacent layer to form a uniform composite layer. The outer layer is made of metallocene polyethylene with superior rigidity and relatively low coefficient of thermal expansion making the liner less susceptible to cracking and useful as a layup structure for molding a structure around it. The liner is then used as a layup structure for outer fibers and infused resin.

1 Claim, 2 Drawing Sheets

Related U.S. Application Data

(60) Provisional application No. 61/815,651, filed on Apr. 24, 2013.

(51) Int. Cl.
*B29C 41/04* (2006.01)
*B29C 41/22* (2006.01)
*B29C 70/86* (2006.01)
*B29C 49/00* (2006.01)
*B29C 41/20* (2006.01)
*B29L 31/00* (2006.01)

(52) U.S. Cl.
CPC .............. *B29C 41/22* (2013.01); *B29C 49/00* (2013.01); *B29C 70/48* (2013.01); *B29C 70/865* (2013.01); *B29K 2023/06* (2013.01); *B29L 2031/7126* (2013.01); *B29L 2031/7156* (2013.01); *B29L 2031/7172* (2013.01)

(56) References Cited

U.S. PATENT DOCUMENTS

| | | | | |
|---|---|---|---|---|
| 5,152,949 | A * | 10/1992 | Leoni | B29C 43/3642 264/257 |
| 5,344,038 | A * | 9/1994 | Freeman | B29C 33/0016 220/562 |
| 6,660,214 | B2 * | 12/2003 | LeBreton | B29C 33/505 264/257 |
| 2005/0129889 | A1 * | 6/2005 | Davis | B29C 70/446 428/36.1 |
| 2008/0203623 | A1 * | 8/2008 | Fujitaka | B29C 41/04 264/515 |
| 2008/0264551 | A1 * | 10/2008 | Wood | B29C 70/446 156/172 |
| 2009/0039566 | A1 * | 2/2009 | Rodman | B29C 70/446 264/529 |
| 2017/0191618 | A1 * | 7/2017 | Kloft | F17C 1/06 |

\* cited by examiner

LINER AND COMPOSITE TANK ASSEMBLY METHOD

This utility patent application is a continuation in part patent application based upon and claims the priority filing date of U.S. utility patent application (application Ser. No. 14/261,078) filed on Apr. 24, 2014 which claimed the priority filing date of U.S. provisional patent application (Application No. 61/815,651) filed on Apr. 24, 2013.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to liners for storage containers and more particular, to such liners that are more durable than liners used in the prior art and can be used to manufacture the outer container in which the liner is placed.

2. Description of the Related Art

Above ground and underground storage tanks are commonly used to store different gases, liquids and fine solids. Such storage tanks are manufactured in different shapes and sizes and usually made of metal or composite materials. They often include valves, ports, and internal conduits.

Two problems with large tanks made of metal are: (1) the outside surfaces and tank's support framework deteriorates when exposed to weather, and (2) material stored inside the tank may react with the tank's interior metal surfaces. Eventually, leaks or cracks are created that require repair or replacement of the entire tank. Sometimes, liners made of composite material that does not react with the stored material are placed inside the tanks to prevent deterioration of the tank's inside metal surfaces.

Tanks made of composite materials are commonly used an alternatives to metal tanks. The tanks are hollow with uniform wall thickness. The most common method to manufacture composite tanks with inside hollow cavities and with uniform side walls is to use a process known as roto-molding. One problem with large tanks made of composite materials is that composite material itself has relatively high coefficient of thermal expansion.

Because the container and tanks are used outdoors and exposed to different weather conditions, cracks often occur. Like metal tanks, liners made of composite material that does not react to the stored material may be placed inside the composite tanks to prevent leakage through the cracks.

What is also needed is an improved liner that can be used inside both metallic and composite tanks that is less susceptible to cracking and leaking. What is also needed is a method of manufacturing a tank made of composite material with pre-manufactured liner placed inside the mold so that the composite tank may be manufactured around the liner.

SUMMARY OF THE INVENTION

An improved liner for a container in which gases, liquids, or powders are stored. The liner is a multi-layer structure that includes an outer layer made of metallocene polyethylene, an intermediate gas and liquid impermeable layer, and one or more inner layers made of thermoplastic material. The metallocene polyethylene layer provides rigidity and has no or very low coefficient of thermal expansion properties making the liner less susceptible to cracking and useful as a layup structure for molding an outer structure around it. The inner most layer is made of composite material compatible with the material stored inside a storage container in which the liner is installed. During the molding process, the inner three layers are sequentially manufactured and then fused together to form a uniform composite liner. The liner may be made by blow molding or roto molding processes.

In one embodiment, the liner is a separate structure that can be inserted into a vacuum mold with a mold cavity configured for the container or tank. The liner is placed inside the mold cavity and used as a layup structure. Water and gas are then placed into the void cavity formed in the liner. Fibers are then laid up around the liner. Resin is then infused over the outer layer. The vacuum mold is then closed and heated. Prior to infusing resin, flame treatment may be used on the outside surface of outer layer of the liner to improved bonding and adhesion.

Because the liner is semi-rigid and has little or zero co-efficient of thermal expansion, it may be uses as a lay-up structure for either roto-molding or blow molding process. In one embodiment, the liner's outer layer made of composite material may become fused and integral with the container's or tanks side walls.

DESCRIPTION OF THE PREFERRED EMBODIMENT(S)

Figure 1:
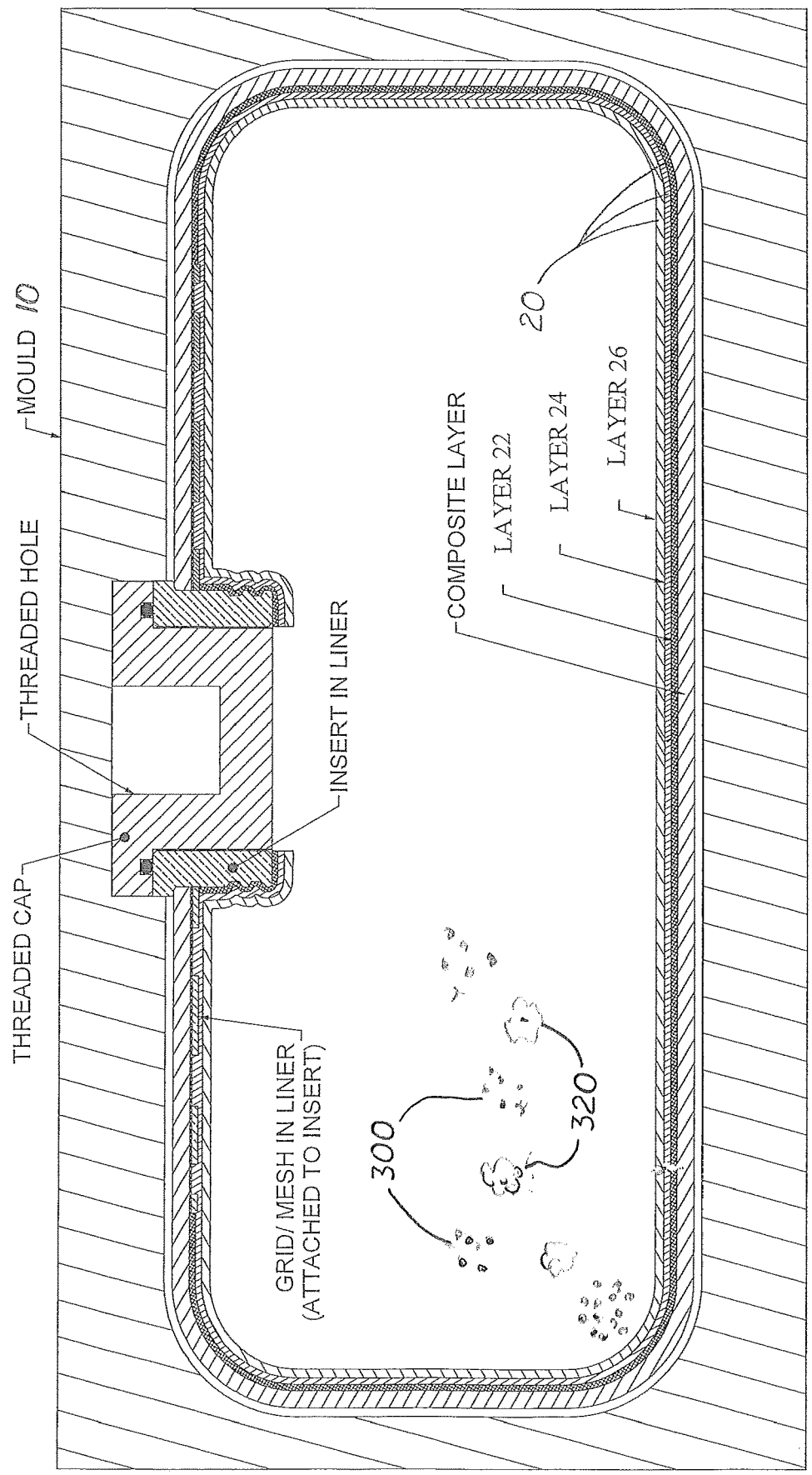
FIG. 1 is a sectional side elevational view of a mold with the outer container made of composite material with the improved liner formed therein.

FIG. 1 is a sectional side elevational view of a mold 10 used to manufacture a composite tank 12 made of composite material with the improved liner 20 formed therein. An improved liner 20 is specifically designed to be used with composite tanks 12 in which gases, liquids, or powders will be stored.

The liner 20 is a multi-layer structure that includes an outer layer made of metallocene polyethylene 22, one or more intermediate gas and liquid impermeable layers 24, and one or more inner layers 26 made of thermoplastic material. The outer layer 22 provides rigidity and has relatively low coefficient of thermal expansion properties making the liner 20 less susceptible to cracking and useful as a layup structure for molding. The intermediate and inner layers 24, 26, respectively, are made of composite material compatible with the material to be stored inside the container or tank in which the liner is installed. The thickness of each intermediate and inner layers 24, 26, respectively, and the number of inner layers 24, 26 may be selectively controlled for use with different stored materials. During the molding process, the inner three layers 22, 24, 26 are bonded and fused together to form a durable, protective liner 20.

It should be understood, however the liner 20 described above is not limited to composite tanks or only used to make in situ tanks. It may be made separately and used with metal containers or tanks.

The liner 20 is manufactured by a roto-molding process that uses a roto-molding machine. The linear 20 is fabricated one layer at a time with allows the thickness of each layer to be precisely controlled. During fabrication, each layer 22, 24, 26 is formed in situ allowed to cure and cool. The intermediate and inner layers are then formed separately inside the outer layer. During the roto-molding process temperature and vacuum pressure is controlled so that the adjacent layers are fused together. When all of the layers have been fabricated, the entire liner 20 is then inspected using ultrasound testing procedures.

The raw material powders used to fabricate the intermediate and inner layers 24, 26 are selected based on the stored material inside the tank 12.

More specifically, each layer 22, 24, and 26 is roto-molded and formed by introducing powder resin that includes metallocene polyethylene and composite fibers into the mold cavity to create the outer layer 22 of the liner 20. The powder is heated to a specific temperature so it becomes a liquid. The mold is then rotated 360 degrees to form the outer layer 22 with the desired dimensions. The above steps are repeated each time for one or more intermediate layers 24. In the preferred embodiment, the intermediate layers 24 and inner layers 26 are made of gas and liquid impermeable material. The inner layer 26 is made of material compatible with the material exposed to the liner 20. When completed, a multi-layer liner 20 with zero coefficient of thermal expansion, and leak resistant. Minimum thickness of each layer 22, 24, 26 should be not less than 1 mm and not thicker than 4 mm.

Figure 3:
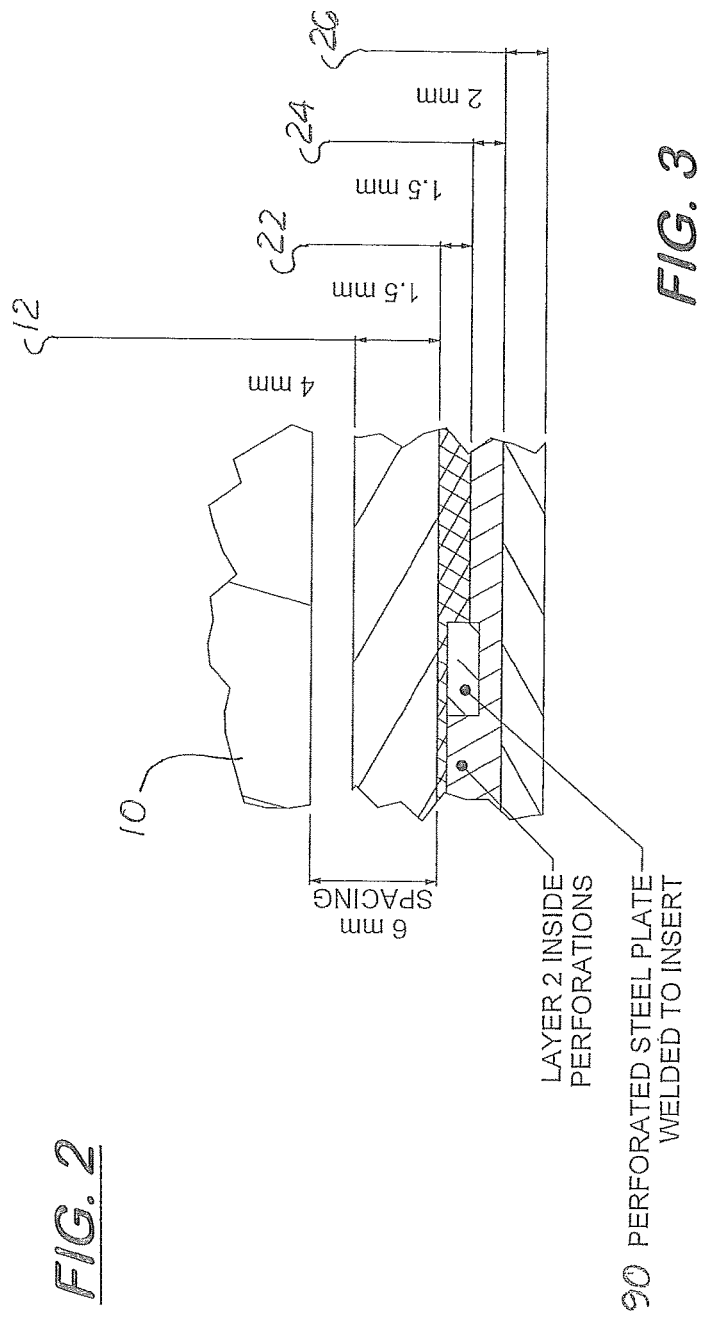
FIG. 3 is a sectional side elevational view of a lower section of the mold shown in FIG. 1.

As shown in FIG. 3, optional metallic's inserts 90 can be in-bedded in the liner 20 to server as supports fort pipe connections.

Bow molding liner is another technology who could used to make the multi layer liner 20. The bow molding process is similar to the process used to fabricate plastic bottles. It is possible to coextruded two, three materials together like a big tube in continuous mode. Very special machinery and equipments must be used to make liners. This technology is used to produce millions of parts.

Figure 2:
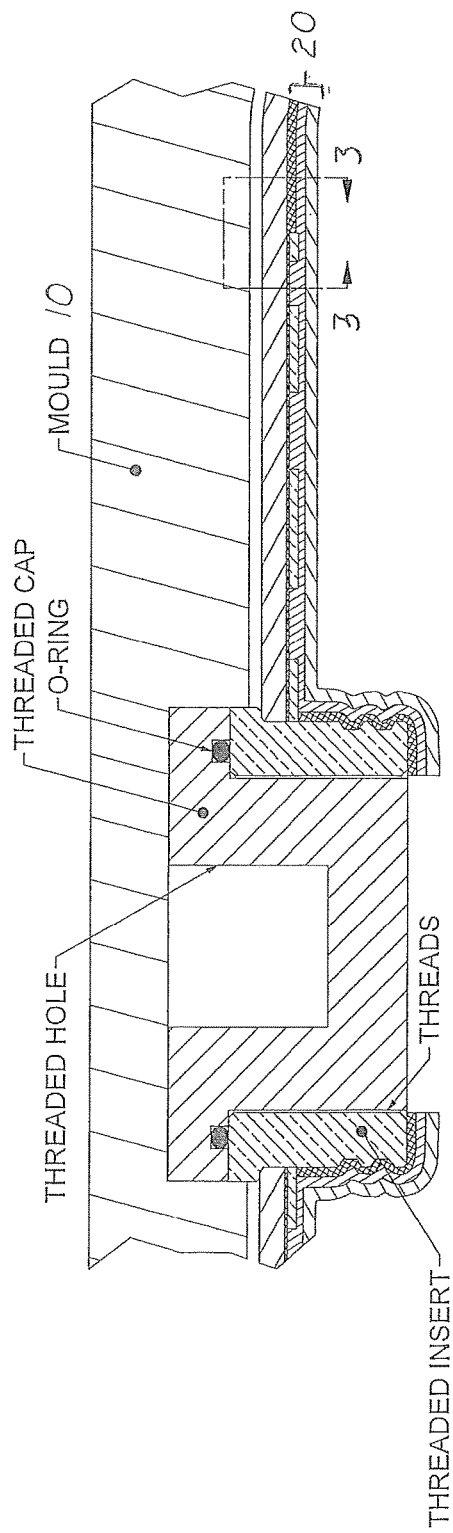
FIG. 2 is a sectional side elevational view of an upper section of the mold shown in FIG. 1.

Also disclosed is a method for fabricating a composite tank 12 using the liner 20 as a build up structure that becomes permanently installed inside the tank 12. FIG. 2 is a sectional side elevational view of an upper section of the mold shown in FIG. 1. FIG. 3 is a sectional side elevational view of a lower section of the mold shown in FIG. 1. During fabrication, the liner 20 is separately manufactured and placed into the mold 10 used to manufacture the tank 12. Fiber plies (not shown) are then built-up around the liner 20. Resin is then infused over the outer layer 22. T Prior to infusing resin, flame treatment may be used on the outside surface of outer layer 22 of the liner 20 to improved bonding and adhesion. As stated above, because the outer layer 22 of the liner 20 is made of material with zero coefficient of thermal expansion, is it ideal for use as a layup structure. The number of layers used determine the thickness of the sidewalls of the tank 12. As stated above, during the lay-up step optional inserts 90 can be added in the structure.

The liner 20 has a closed inner void which is filled with a sufficient volume of water 300 and gas 320, typically air. When placed in the vacuum mold and heated, the water 300 and gas 320 inside the liner expands and forces the liner outward against the inside walls of the vacuum mold 10.

A vacuum is applied and the vacuum mold is heated. By partially filling the void of the liner with water 300 and regulating the amount of gas 320 inputted into the void area a safer process for manufacturing is provided. Also, the liner is more sufficiently stretched against the inside surface of the mold cavity. The water may be heated to 90 degree C. to start the polymerization of the resin. The polymerization takes place for approximately one hour at 100 degree C. Before reaching 100 degrees C., all the water 300 when approximately 90 degrees C. is forced out of the void area by the pressurized air which prevents formation of steam inside the liner 20.

All the above steps may be controlled by a computer.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

We claim:

1. A method of manufacturing a container or tank used to hold a volume of liquid or gas, comprising the following steps:

a. selecting a roto-mold with a mold cavity configured for forming an inner liner using a roto-molding process;

b. forming a multi-layer inner liner inside the mold cavity of the roto-mold, the inner liner includes an inner cavity located inside a first layer made of metallocene polyethylene formed using a roto molding process, a second layer made of composite material formed in situ over the inside surface of the first layer of metallocene using a roto-molding process, and a third layer formed made of composite material compatible with the liquid or gas placed inside the container or tank, said third layer being formed in situ over the inside surface second layer made of composite material using a roto-molding process;

c. filling the inner cavity of the inner liner with a sufficient amount of water and pressurized air so that the inner liner expands and stretches when heated;

d. laying up fibers around the outside surface of the third layer of the inner liner to form an outer shell for the container or tank;

e. placing the inner liner with the laid-up fibers into a mold cavity of a vacuum mold configured to manufacture the outer shell;

f. flame heating the inner liner;

g. closing the vacuum mold and injecting resin infusion into the mold cavity located outside and adjacent to the first layer;

h. applying vacuum and placing the vacuum mold into an oven;

i. removing the vacuum mold from the oven;

j. cooling the vacuum mold; and k. removing the outer shell with the inner liner from the vacuum mold.

* * * * *